(12) United States Patent
Golden

(10) Patent No.: US 9,132,926 B2
(45) Date of Patent: Sep. 15, 2015

(54) SYSTEMS AND METHODS FOR PROVIDING INSULATION

(71) Applicant: The Boeing Company, Chicago, IL (US)

(72) Inventor: Johnny L. Golden, Houston, TX (US)

(73) Assignee: The Boeing Company, Chicago, IL (US)

( * ) Notice: Subject to any disclaimer, the term of this patent is extended or adjusted under 35 U.S.C. 154(b) by 39 days.

(21) Appl. No.: 13/797,257

(22) Filed: Mar. 12, 2013

(65) Prior Publication Data

US 2014/0272252 A1 Sep. 18, 2014

(51) Int. Cl.
*B64G 1/58* (2006.01)
*B64C 1/40* (2006.01)

(52) U.S. Cl.
CPC ... *B64G 1/58* (2013.01); *B64C 1/40* (2013.01); *Y10T 428/231* (2015.01); *Y10T 428/239* (2015.01)

(58) Field of Classification Search
CPC .............. B32B 1/06; B32B 7/02; B32B 5/16; B32B 15/08; B32B 2307/304; B32B 27/06; B32B 2367/00; B32B 33/00; B64G 1/58
USPC ........................ 428/69, 76; 156/182; 181/284
See application file for complete search history.

(56) References Cited

U.S. PATENT DOCUMENTS

| 3,690,065 | A | | 9/1972 | Louis |
|---|---|---|---|---|
| 4,303,729 | A | | 12/1981 | Torobin |
| 4,923,741 | A | * | 5/1990 | Kosmo et al. ................. 442/187 |
| 5,347,816 | A | | 9/1994 | Chilenskas et al. |
| 5,549,956 | A | | 8/1996 | Handwerker |
| 5,651,255 | A | | 7/1997 | d'Ussel et al. |
| 6,221,456 | B1 | * | 4/2001 | Pogorski et al. ................. 428/69 |
| 7,105,127 | B2 | | 9/2006 | Vatchiants |
| 2004/0005450 | A1 | | 1/2004 | Aanestad |
| 2007/0250025 | A1 | | 10/2007 | Sams |
| 2008/0213688 | A1 | | 9/2008 | Iwasaki |

(Continued)

FOREIGN PATENT DOCUMENTS

| CA | 2 243 489 A1 | 2/2000 |
|---|---|---|
| EP | 1 626 133 A1 | 2/2006 |

OTHER PUBLICATIONS

Extended European Search Report, Application No. 14159299.8-1303, Applicant: The Boeing Company, Date: May 27, 2014, (7) pgs.

(Continued)

*Primary Examiner* — Maria Veronica Ewald
*Assistant Examiner* — Brian Handville
(74) *Attorney, Agent, or Firm* — Joseph M. Butscher; The Small Patent Law Group, LLC

(57) ABSTRACT

Systems and methods provide a multi-layer insulation (MLI) that includes a plurality of sealed metalized volumes in a stacked arrangement, wherein the plurality of sealed metalized volumes encapsulate a gas therein, with the gas having one of a thermal insulating property, an acoustic insulating property, or a combination insulating property thereof. The MLI also includes at least one spacer between adjacent sealed metalized volumes of the plurality of sealed metalized volumes and a protective cover surrounding the plurality of sealed metalized volumes.

15 Claims, 5 Drawing Sheets

(56) References Cited

U.S. PATENT DOCUMENTS

2010/0252698 A1* 10/2010 Dye et al. .................. 248/177.1
2013/0149481 A1   6/2013 Caps et al.

OTHER PUBLICATIONS

Finckenor, "Multilayer Insulation Material Guidelines", Marshall Space Flight Center, Alabama, NASA/TP-1999-209263, Apr. 1999.

* cited by examiner

SYSTEMS AND METHODS FOR PROVIDING INSULATION

STATEMENT REGARDING FEDERALLY SPONSORED RESEARCH AND DEVELOPMENT

The invention was made with government support under Contract Number NAS15-1000 awarded by NASA. The U.S. Government has certain rights in this invention.

BACKGROUND

The present disclosure relates generally to thermal and acoustic insulation, such as for aircraft or spacecraft.

Multi-layer insulation (MLI) is routinely used for spacecraft thermal control or design and is typically constructed from multiple layers of thin sheets of material having a space vacuum between the individual layers. MLI is used in spacecraft to reduce heat loss by thermal radiation. However, conventional MLI does not insulate against other thermal loss mechanisms, such as heat conduction or convection. Accordingly, MLI is commonly used for satellites and other applications in a vacuum where radiation is more significant than conduction and convection.

Additionally, foam insulations are also used for thermal control or design, as well as acoustic control or design. However, these foam insulations do not work in vacuum and are not employed for spacecraft thermal insulation. In addition, foams are fragile, producing particulate contamination, and also can be very difficult to handle under maintenance conditions (normally removed and replaced). Additionally, with respect to acoustic control or design, sound baffles that reflect acoustic energy and active noise cancellation devices also are used, which also add weight and cost to the overall system.

SUMMARY

In accordance with one embodiment, a multi-layer insulation (MLI) is provided that includes a plurality of sealed metalized volumes in a stacked arrangement, wherein the plurality of sealed metalized volumes encapsulate a gas therein, with the gas having one of a thermal insulating property, an acoustic insulating property, or a combination insulating property thereof. The MLI also includes at least one spacer between adjacent sealed metalized volumes of the plurality of sealed metalized volumes and a protective cover surrounding the plurality of sealed metalized volumes.

In accordance with another embodiment, a method for providing a multi-layer insulation (MLI) is provided. The method includes encapsulating a gas within a sealed metalized volume, wherein the gas has one of a thermal insulating property, an acoustic insulating property, or a combination insulating property thereof. The method also includes stacking a plurality of the sealed metalized volumes with a spacer between adjacent sealed metalized volumes of the plurality of sealed metalized volumes and placing the stacked plurality of sealed metalized volumes in a protective cover. The method further includes fastening the cover to secure the plurality of sealed metalized volumes therein.

The features and functions discussed can be achieved independently in various embodiments or may be combined in yet other embodiments, further details of which can be seen with reference to the following description and drawings.

DETAILED DESCRIPTION

Figure 1:
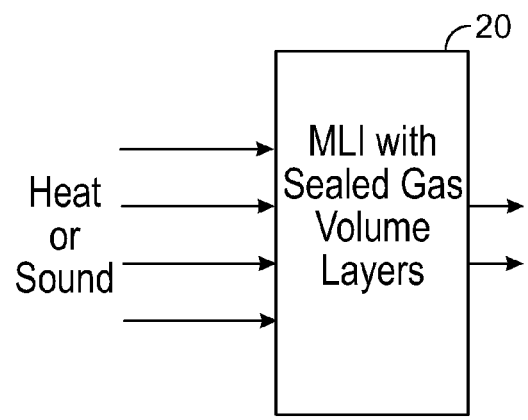
FIG. 1 is a simplified block diagram of multi-layer insulation (MLI) formed in accordance with various embodiments.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide systems and methods for thermal and/or acoustic insulation. In particular, various embodiments provide a multi-layer insulation (MLI), such as for terrestrial applications, that includes a sealed gas volume between each of a plurality of layers of the MLI structure. For example, in various embodiments, an MLI blanket design is provided having a low density (e.g., less than 0.3 lbs/ft$^3$). While the various embodiments may be described in connection with a particular application, such as an aircraft application, the various embodiments may be used in different applications, such as land, air, sea and pressurized space applications, as well as non-transport or non-mobile platform applications.

More particularly, the MLI design of various embodiments removes vent paths within the insulation structure and instead encapsulates or traps gas between or within one or more layers (e.g., plastic film layers) to form an MLI, such as for terrestrial applications. By practicing various embodiments, heat transfer through the MLI is reduced or limited by reducing conductive, convective and radiative heat transfer. By practicing various embodiments, acoustic energy may be absorbed and/or sound transmission reduced or impeded.

FIG. 1 is a simplified block diagram of a multi-layer structure, illustrated as an MLI 20 formed in accordance with various embodiments. The MLI 20 generally includes plurality of sealed-gas-volume layers to reduce heat or sound transfer or transmission from one side of the MLI 20 to the other side of MLI 20, represented by the change in size and quantity of arrows in FIG. 1. It should be noted that the MLI 20 blocks or reduces the transfer or transmission of heat or sound in either direction across the structure forming the MLI 20. In some embodiments, the MLI 20 is formed as a blanket to facilitate removal and reinstallation. Additionally, the sealed-gas-volume layers may be sealed areas or chambers with a gas sealed therein, which is selected to provide heat or acoustic blocking or dampening properties.

Figure 2:
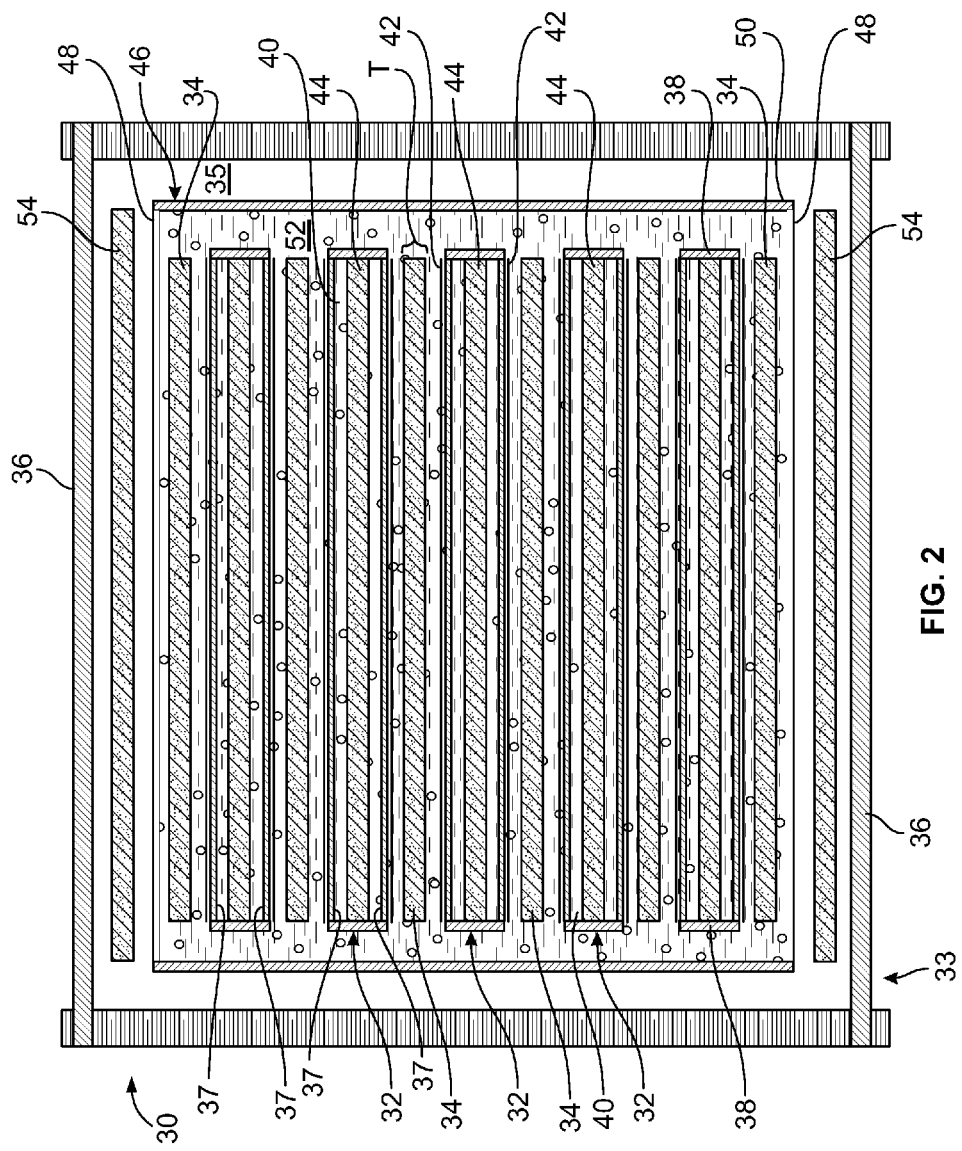
FIG. 2 is a schematic illustration of an MLI structure formed in accordance with an embodiment.

FIG. 2 is one embodiment of an MLI 30 that may be provided. The MLI 30 in the illustrated embodiment is a thermal MLI 30 configured to block or reduced the transfer or transmission of heat therethrough. As can be seen, the MLI 30 includes a plurality of sealed volumes 32 (e.g., sealed gas chambers or cavities), which may be provided in a stacked arrangement, such that a plurality of sealed-gas-volume layers are thereby defined. For example, a plurality of sealed volumes 32 may be arranged in an adjacent relationship within a housing 33 (e.g., protective cover), which in various embodiments are formed from deformable or movable covers 36, such as strong fiber cloth material, that are sewn or otherwise fastened together to maintain the plurality of sealed volumes 32 therein. For example, in some embodiments, the covers 36 may be formed from a beta cloth or polyaramid laminate, among other materials. In various embodiments, the covers 36 are formed from a light durable material to construct a final sealed volume as described herein. In some embodiments, the covers 36 may have a thickness of between about 5 mils and about 10 mils. However, other thicknesses of covers 36 may be provided. In various embodiments, the covers 36 are formed from a material that is resistant, for example, to chemicals, cleaning agents and solvents, or different caustic materials. The covers 36 in various embodiments are also non-flammable.

The number of sealed volumes 32 within the housing 33 may be varied as desired or needed, and the five shown are merely for illustration. For example, based on a desired or needed thermal resistance, additional or fewer layers may be provided. In some embodiments, ten, twenty or more sealed volumes 32 are provided in a layered arrangement to define an overall thermal resistance. In the illustrated embodiment, a spacer 34 (e.g., a segment of spacer material) is positioned between adjacent sealed volumes 32 to define a spacing or gap therebetween formed by the thickness T of the spacer 34. It should be noted that although a spacing is shown between the spacer 34 and each of the adjacent sealed volumes 32, this is shown for ease of illustration and such a spacing is not necessarily provided when the sealed volumes 32 are arranged and aligned within the housing 33. For example, when the covers 36 are sewn or fastened together (e.g., to define a closure to create a blanket package), the entire arrangement is secured together, such that the spacers 34 are sandwiched between adjacent sealed volumes 32 (e.g., in abutting engagement therewith). For example, all but one of the edges of the covers 36 may be stitched together to create an opening therein for inserting the layered structure (as described herein) into an interior 35 of the covers 36, with the last edge then stitched together. It also should be noted that the relative dimensions, for example, the thicknesses of the various components and layers are not necessarily to scale. The covers 36 form a protective overall assembly, such that, for example, a blanket type structure is formed that may be manipulated, such as installed and reinstalled as needed or desired. In some embodiments, the overall structure has a density of about 0.3 lbs/ft$^3$ to about 6 lbs/ft$^3$.

Thus, in various embodiments, a repeating alternating arrangement of sealed volumes 32 and spacers 34 are provided. It should be noted that the thicknesses of the sealed volumes 32 and spacers 34 may be varied as desired or needed. Additionally, variations are contemplated, such as not providing spacers 34 between one or more adjacent sealed volumes 32. As another variation, more than one spacer 34 may be positioned between adjacent sealed volumes 32.

In one embodiment, the sealed volumes 32 are formed from plastic film layers 37 that are sealed together, such as using a thermal seal 38, which are illustrated as sealing of the edges of the film layers 37 to form a sealed internal volume 40 capable of holding a gas therein. For example, the sealed internal volumes 40 may have a gas sealed therein in an airtight type arrangement such that gas is prevented from passing or permeating out of the sealed volumes 32. In various embodiments, the plastic film layers 37 are metalized film layers sealed around a perimeter thereof to form the sealed volumes 32, which in some embodiments have a thickness, for example, between about 0.5 mil to about 10 mil. As can be seen, a metalized surface 42 is provided on the exterior side of each of the sealed volumes 32. The metalized surface 42 may be a thin metal layer, such as a 1000 angstrom (nominal) metallization layer on one surface of the plastic film layers 37. For example, in some embodiments, the plastic film layers 37 may be an aluminized plastic film (having aluminum on one side, which in the illustrated embodiment is on the outer surface of the sealed volumes 32) such as Aluminum-Polyimide (e.g., Al-Kapton®) or Aluminum-Polyester (e.g., Al-Mylar®), among others. The material used for the plastic film layers 37 may be selected based on particular properties desired or needed. For example, if operation is not at higher temperatures, an aluminized polyester may be used. However, if operation is at higher temperatures, an aluminized polyimide may be used. Additionally, the materials selected may be based on other properties, such as flammability characteristics.

Additionally, the spacers 34 may be formed from different materials, such as a scrim cloth or foam material. For example, the spacers 34 may be formed from materials such as a polyaramid (e.g., Nomex®), a polyethylene terephthalate (e.g., Dacron®) or a polyimide material, among others. Additionally, spacers 44 are provided within the sealed volumes 32, which may be formed from similar material as the spacers 34. It should be noted that multiple layers of spacers 44 may be provided within one or more of the sealed volumes 32. Additionally, the spacers 34 and 44 may have the same dimensions, for example, thickness, or different dimensions.

Each of the sealed volumes 32 has a gas sealed therein. For example, a gas may be filled into each of the sealed volumes 32, such as a high viscosity/dense gas. In various embodiments, the viscosity and/or density may be selected, for example, based on the insulation operating temperature range. In some embodiments, the density has a range between about 1.2 and 6.2 grams per liter at 0 degrees Celsius (Air to SF6) and the viscosity has a range between about 0.018 and 0.024 centipoises. In one embodiment, the density is between 1.29 and 6.17 grams per liter at 0 degrees Celsius. It should be appreciated that different densities or viscosities may be provided as desired or needed. In one or more embodiments, the gas filled within one or more of the sealed volumes 32 is an inert gas, such as Argon (Ar), Krypton (Kr), Xenon (Xe), Sulfur Hexafluoride ($SF_6$), or air, among others, or combinations thereof. Additionally, different gases may be filled within one or more of the sealed volumes 32. In some embodiments, air, alone or in combination with one or more other gases may be filled within the sealed volumes 32. It should be noted that the sealed volumes 32 may be backfilled, such as with air or $SF_6$.

In one embodiment, the layered sealed volumes 32 in the repeating arrangement, having the spacers 34 and 44, are also sealed within an internal housing 46. The internal housing 46 may be formed from plastic film layers 48 that are thermally sealed by seals 50, which may be similar to the plastic film layers 37 and seals 38. The internal housing 46 may define a cavity or sealed volume in which the layered sealed volumes 32 are sealed and having a gas therein. For example, a gas similar to the gas within the sealed volumes 32 may be provided in some embodiments. In other embodiments, a different gas may be provided within the sealed volume 52 than the sealed volumes 32. In the illustrated embodiment, a spacer 34 is positioned between the top and bottom sealed volumes 32 and the respective plastic film layers 48. In some embodiments, the plastic film layers 48 are not metalized.

Additionally, with the internal housing 46 inserted within the interior 35 of the covers 36, in some embodiments, a spacer 54 is optionally provided between the internal housing 46 and the covers 36. The spacer 54 may be similarly formed to the spacers 34 and 44. Additionally, more than one spacer 54 may be provided.

Thus, the sealed volumes 32 create or form cavities of gas with metalized surfaces 42 (e.g., metalized films) that are made impermeable to gas transfer from within the sealed volumes 32 to outside the sealed volumes 32. The spacers 34 are additionally provided in various embodiments to maintain the sealed volumes 32 with a gap therebetween such that adjacent sealed volumes 32 are not in direct contact with each other. Each of the sealed volumes 32 may be filled or overfilled as desired or needed. Additionally, by adding layers, namely by adding layers of sealed volumes 32, additional thermal insulation is provided in various embodiments.

Figure 3:
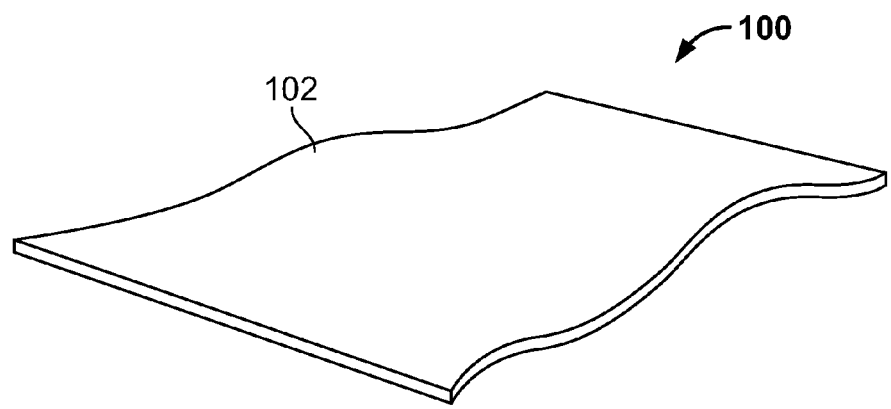
FIG. 3 is an illustration of an MLI blanket formed in accordance with an embodiment.

FIG. 3 illustrates an MLI blanket 100 that may be formed in accordance with various embodiments. The MLI blanket 100 may be embodied as the MLI 20, 30 or 130 having an internal structure with repeating sealed gas volumes and an outer surface 102 formed from a light and durable material, such as a cloth material as described in more detail herein. As should be appreciated, the dimensions, including the size and shape of the MLI blanket 100 may be varied as desired or needed. Additionally, the selection of the number of layers of sealed gas volumes may be based on thermal or acoustic insulation characteristics (e.g., an amount of thermal insulation or acoustic insulation) desired or needed, as well as the space constraints into which the MLI blanket 100 is to be installed. Thus, by adding more layers in series, a different amount of thermal or acoustic insulation may be provided.

Figure 4:
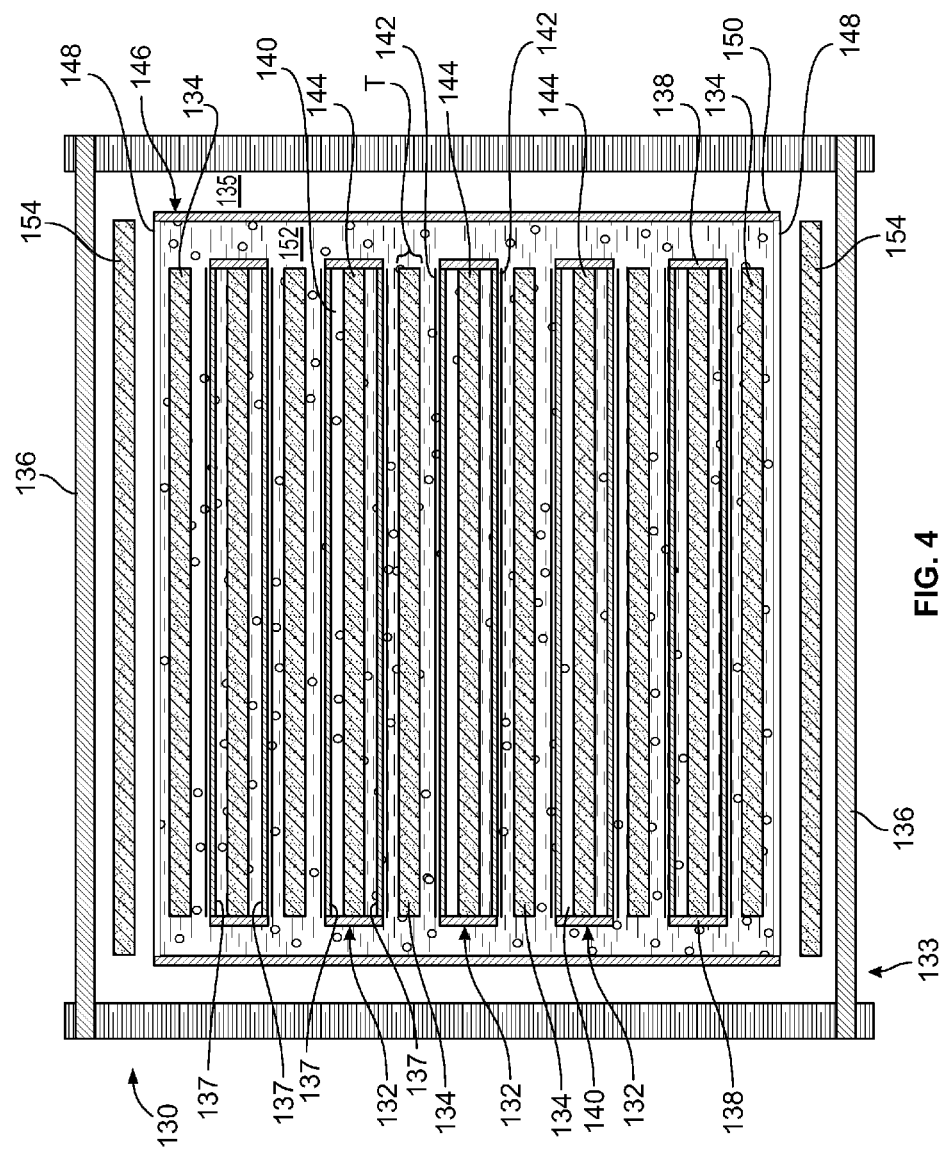
FIG. 4 is a schematic illustration of an MLI structure formed in accordance with another embodiment.

FIG. 4 is another embodiment of an MLI 130 that may be provided. The MLI 130 in the illustrated embodiment is an acoustic MLI 130 configured to block or reduce the transfer or transmission of acoustic energy therethrough, such as to absorb acoustic energy and impede sound transmission. As can be seen, the MLI 130 includes a plurality of sealed volumes 132 (e.g., sealed gas chambers), which may be provided in a stacked arrangement, such that a plurality of sealed-gas-volume layers are thereby defined. For example, a plurality of sealed volumes 132 may be arranged in an adjacent relationship within a housing 133, which in various embodiments are formed from deformable or movable covers 136, such as strong fiber cloth material, that are sewn or otherwise fastened together to maintain the plurality of sealed volumes 132 therein. For example, in some embodiments, the covers 136 may be formed from a beta cloth or polyaramid laminate, among other materials. In various embodiments, the covers 136 are formed from a light durable material to construct a final sealed volume as described herein. In some embodiments, the covers 136 may have a thickness of between about 5 mils and about 10 mils. However, other thicknesses of covers 136 may be provided. In various embodiments, the covers 136 are formed from material that is resistant, for example, to chemicals, cleaning agents and solvents, as well as different caustic materials. The covers 136 in various embodiments are also non-flammable.

The number of sealed volumes 132 within the housing 133 may be varied as desired or needed, and the five shown are merely for illustration. For example, based on a desired or needed acoustic resistance, additional or fewer layers may be provided. Is some embodiments, ten, twenty or more sealed volumes 132 are provided in a layered arrangement to define an overall acoustic resistance. In the illustrated embodiment, a spacer 134 is positioned between adjacent sealed volumes 132 to define a spacing or gap therebetween formed by the thickness T of the spacer 134. It should be noted that although a spacing is shown between the spacer 134 and each of the adjacent sealed volumes 132, this is shown for ease of illustration and such a spacing is not necessarily provided when the sealed volumes 132 are arranged and aligned within the housing 133. For example, when the covers 136 are sewn or fastened together (e.g., to define a closure to create a blanket package), the entire arrangement is secured together, such that the spacers 134 are sandwiched between adjacent sealed volumes 132 (e.g., in abutting engagement therewith). For example, all but one of the edges of the covers 136 may be stitched together to create an opening therein for interesting the layered structure (as described herein) into an interior 135 of the covers 136, with the last edge then stitched together. It also should be noted that the relative dimensions, for example, the thicknesses of the various components and layers are not necessarily to scale. The covers 136 form a protective overall assembly, such that, for example, a blanket type structure is formed that may be manipulated, such as installed and reinstalled as needed or desired. In some embodiments, the overall structure has a density of about 0.3 lbs/ft$^3$ to about 6 lbs/ft$^3$.

Thus, in various embodiments, a repeating alternating arrangement of sealed volumes 132 and spacers 134 are provided. It should be noted that the thicknesses of the sealed volumes 132 and spacers 134 may be varied as desired or needed. Additionally, variations are contemplated, such as not providing spacers 134 between one or more adjacent sealed volumes 132. As another variation, more than one spacer 134 may be positioned between adjacent sealed volumes 132.

In one embodiment, the sealed volumes 132 are formed from plastic film layers 137 that are sealed together, such as using a thermal seal 138, which are illustrated as sealing of the edges of the film layers 137 to form a sealed internal volume 140 capable of holding a gas therein. For example, the sealed internal volumes 140 may have a gas sealed therein in an airtight type arrangement such that gas is prevented from passing or permeating out of the sealed volumes 132. In various embodiments, the plastic film layers 137 are metalized film layers sealed around a perimeter thereof to form the sealed volumes 132, which in some embodiments have a thickness, for example, between about 0.5 mil to about 10 mil. As can be seen, a metalized surface 142 is provided on the outside of each of the sealed volumes 132. The metalized surface 142 may be a thin metal layer, such as a 1000 angstrom (nominal) metallization layer on one surface of the plastic film layers 137. For example, in some embodiments, the plastic film layers 137 may be an aluminized plastic film (having aluminum on one side, which in the illustrated embodiment is on the outer surface of the sealed volumes 132) such as Al-polyimide or Al-polyester, among others. The material used for the plastic film layers 137 may be selected based on particular properties desired or needed. For example, if operation is not at higher temperatures, an aluminized polyester may be used. However, if operation is at higher temperatures, an aluminized polyimide may be used. Additionally, the materials selected may be based on other properties, such as flammability characteristics.

Additionally, the spacers 134 may be formed from different material, such as a scrim cloth or foam material. For example, the spacers 134 may be formed from materials such as polyaramid, polyethylene terephthalate or polyimide, among others. Additionally, spacers 144 are provided within the sealed volumes 132, which may be formed from similar material as the spacers 134. It should be noted that multiple layers of spacers 144 may be provided within one or more of the sealed volumes 132. Additionally, the spacers 134 and 144 may have the same dimensions, for example, thickness, or different dimensions.

Each of the sealed volumes 132 has a gas sealed therein. For example, a gas may be filled into each of the sealed volumes 132, such as a high viscosity/dense gas. In some embodiments, the gas fill within one or more of the sealed volumes 132 is an inert gas, such as Argon (Ar), Krypton (Kr), Xenon (Xe), Sulfur Hexafluoride ($SF_6$), or air, among others, or combinations thereof. Additionally, different gases may be filled within one or more of the sealed volumes 132. In some embodiments, air, alone or in combination with one or more other gases may be filled within the sealed volumes 132.

In one embodiment, the layered sealed volumes 132 in the repeating arrangement, having the spacers 134 and 144, are also sealed within an internal housing 146. The internal housing 146 may be formed from plastic film layers 148 that are thermally sealed by seals 150, which may be similar to the plastic film layers 137 and seals 138. The internal housing 146 may define a cavity or sealed volume in which the layered sealed volumes 132 are sealed and having a gas therein. For example, a gas similar to the gas within the sealed volumes 132 may be provided in some embodiments. In other embodiments, a different gas may be provided within the sealed volume 152 than the sealed volumes 132. In the illustrated embodiment, a spacer 134 is positioned between the top and bottom sealed volumes 132 and the respective plastic film layers 148. In some embodiments, the plastic film layers 148 are not metalized.

Additionally, with the internal housing 146 inserted within the interior 135 of the covers 136, in some embodiments, a spacer 154 is optionally provided between the internal housing 146 and the covers 136. The spacer 154 may be similarly formed to the spacers 134 and 144. Additionally, more than one spacer 154 may be provided.

Thus, the sealed volumes 132 create or form cavities of gas with metalized surfaces 142 (e.g., metalized films) that are made impermeable to gas transfer from within the sealed volumes 132 to outside the sealed volumes 132. The spacers 134 are additionally provided in various embodiments to maintain the sealed volumes 132 with a gap between such that adjacent sealed volumes 132 are not in direct contact with each other. Each of the sealed volumes 132 may be filled or overfilled as desired or needed. Additionally, by adding layers, namely by adding layers of sealed volumes 132, additional acoustic isolation/dampening is provided in various embodiments.

The MLI 20, 30 or 130 may be used in different applications, for example, in the pressurized volume of a spacecraft or within the wing of an aircraft (e.g., duct and spar insulation). However, the MLI 20, 30 or 120 may be used anywhere within the aircraft or airframe where insulation is desired or needed. The MLI 20, 30 or 120 may be used in different applications as well, such as for an emergency blanket, an insulating blanket, an insulation wrap, or a drink cooler, among others. Additionally, the blanket structure of the MLI 20, 30 or 120 may be removed and then reinstalled without damage to the insulative material. Additionally, it should be noted that one or more of the various embodiments may be combined, for example, to provide an MLI having thermal and acoustic blocking or insulating properties.

Figure 5:
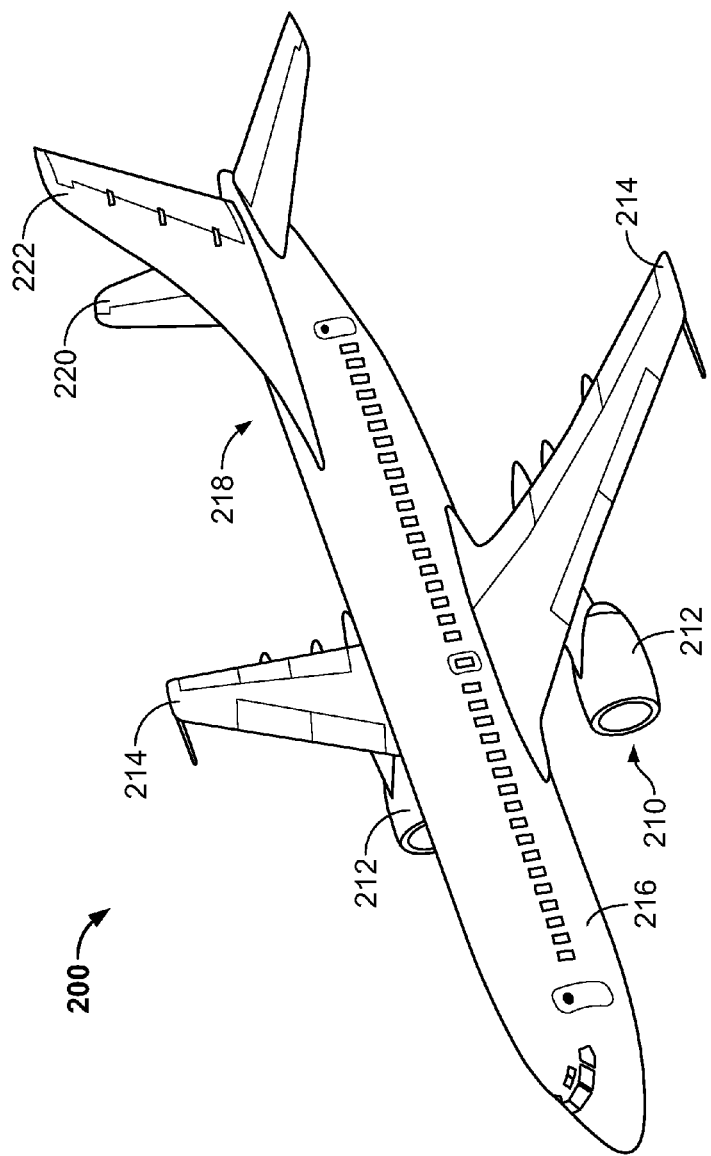
FIG. 5 is an illustration of an aircraft having parts that may be insulated in accordance with various embodiments.

As described above, the various embodiments may be used to insulate parts in a wing or any other assembly such as an aircraft. For example, FIG. 5 illustrates an aircraft 200 having parts that may be insulated using various embodiments described above. The aircraft 200 includes a propulsion system 210 that includes two turbofan engines 212. The engines 212 are carried by the wings 214 of the aircraft 200. In other embodiments, the engines 212 may be carried by the fuselage 216 and/or the empennage 218. The empennage 218 can also support horizontal stabilizers 220 and a vertical stabilizer 222.

Figure 6:
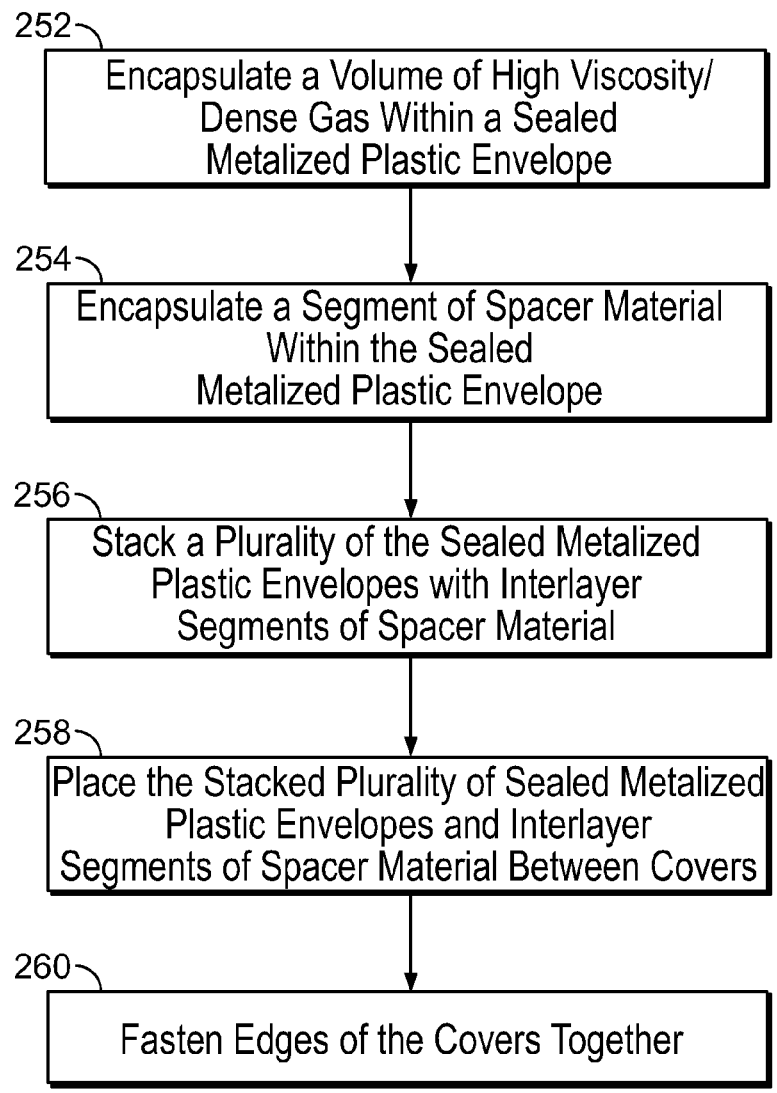
FIG. 6 is an illustration of operations performed by various embodiments for providing MLI.

Various embodiments also provide a method 250 as shown in FIG. 6 for providing an MLI, which may be a thermal or acoustic MLI, or a combination thereof. The MLI may be formed or constructed to be embodied as the MLI 20, 30 or 130, for example. The method 250 includes encapsulating a volume of high viscosity/dense gas within a sealed metalized plastic envelope comprising metalized plastic film layers at 252. In some embodiments the gas has a low thermal conductivity, a low acoustic conductivity or a combination thereof. The sealed metalized plastic envelope may take different shapes and forms, for example, the sealed volumes 32 as described in more detail herein. The gas is encapsulated in a structure that maintains the gas therein and prevents or reduces the likelihood of gas transfer out of the structure. The structure and sealing arrangement may be provided using any suitable means, which may be based on, for example, the operating environment for the MLI (e.g., temperature or pressure of the environment).

The method 250 also includes encapsulating a segment of spacer material within the sealed metalized plastic envelope at 254. For example, as described herein, the spacer 44 may be positioned within the sealed volume 32. It should be noted that the spacer may be formed from a low thermal conductivity or low acoustic conductivity material, or a combination thereof as described herein. The spacer may be formed in some embodiments from a foam material. The sealed volume 32 may be sealed using a thermal sealing process.

The method 250 further includes stacking a plurality of the sealed metalized plastic envelopes with interlayer segments of spacer material at 256. For example, one or more spacers, such as the spacers 34, may be positioned between adjacent sealed metalized plastic envelopes. It should be noted that the various layers, such as the sealed metalized plastic envelope and the spacers may be coupled together in different ways, for example, using an adhesive or glue, or may be held together by covers on either side of the sealed metalized plastic envelopes. The number of layers of sealed metalized plastic envelopes and spaces may be varied based on desired or needed thermal or acoustic properties.

The method 250 additionally includes placing the stacked plurality of sealed metalized plastic envelopes (stacked sealed metalized volumes) and interlayer segments of spacer material between covers at 258. For example, protective cloth covers may be used to encase the plurality of sealed metalized plastic envelopes and spacers to form an MLI blanket as described herein. The edges of the covers are fastened together to secure the plurality of sealed metalized plastic envelopes and spacers therein at 260. It should be noted that the edges may initially be coupled together leaving an opening for inserting the stacked arrangement of sealed metalized plastic envelopes therein and then the opening coupled together to form a secure inner compartment that may form an insulation blanket. The edges may be secured together, for example, by sewing, gluing, chemical adhesion, thermal adhesion, mechanical fastening or friction welding, among other methods. It should be noted that these method also may be used to secure or form other cavities or volumes of the various embodiments. The insulation blanket may be used as a multi-layer thermal or acoustic insulation.

Thus, various embodiments provide multi-layer thermal or acoustic insulation that may have different degrees of insulation based on the number of layers used and the gases sealed within internal volumes of the MLI.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A multi-layer insulation (MLI) comprising:
    a plurality of sealed metalized volumes in a stacked arrangement, the plurality of sealed metalized volumes encapsulating a gas therein, the gas having one of a thermal insulating property, an acoustic insulating property, or a combination insulating property thereof;
    at least one first spacer between adjacent sealed metalized volumes of the plurality of sealed metalized volumes, wherein the at least one first spacer is outside of each of the plurality of sealed metalized volumes;
    at least one second spacer within at least one of the plurality of sealed metalized volumes; and
    a protective cover surrounding the plurality of sealed metalized volumes, wherein the protective cover defines an interior space that contains the plurality of sealed metalized volumes and the at least one first spacer, and wherein the protective cover retains one of the gas or another gas within the interior space around the plurality of sealed metalized volumes and the at least one first spacer.

2. The MLI of claim 1, further comprising a plurality of second spacers, wherein at least one of the plurality of second spacers is within each of the plurality of sealed metalized volumes.

3. The MLI of claim 1, wherein the plurality of sealed metalized volumes comprise metalized plastic film layers sealed together, the metalized plastic film layers having a metalized surface, wherein the metalized surface is positioned on an exterior side of the plurality of sealed metalized volumes.

4. The MLI of claim 1, wherein the gas is one of Argon (Ar), Krypton (Kr), Xenon (Xe), Sulfur Hexafluoride ($SF_6$), or a combination thereof.

5. The MLI of claim 1, wherein the plurality of sealed metalized volumes comprises one of Al-polyimide, Al-polyester, or aluminized plastic film with aluminum on one side thereof.

6. The MLI of claim 1, wherein each of the at least one first spacer and the at least one second spacer comprises a polyaramid, polyethylene terephthalate, polyimide material, or a combination thereof.

7. The MLI of claim 1, wherein the covers comprise at least one of beta cloth or polyaramid laminate material.

8. A method for providing a multi-layer insulation (MLI), the method comprising:
    disposing a first spacer within a sealed metalized volume;
    encapsulating a gas within the sealed metalized volume, the gas having one of a thermal insulating property, an acoustic insulating property, or a combination insulating property thereof;
    stacking a plurality of the sealed metalized volumes with a second spacer between adjacent sealed metalized volumes of the plurality of sealed metalized volumes, wherein the second spacer is outside of each of the plurality of sealed metalized volumes;
    surrounding the stacked plurality of sealed metalized volumes with a protective cover; and
    retaining one of the gas or another gas within an interior space of the protective cover that surrounds the stacked plurality of sealed metalized volumes, wherein one of the gas or another as are retained around the plurality of sealed metalized volumes and the second spacer.

9. The method of claim 8, further comprising using as the plurality of sealed metalized volumes a plurality of metalized plastic film layers sealed together, the metalized plastic film layers having a metalized surface, wherein the metalized surface is positioned on an exterior side of the plurality of sealed metalized volumes.

10. The method of claim 8, further comprising using as the gas one of Argon (Ar), Krypton (Kr), Xenon (Xe), Sulfur Hexafluoride ($SF_6$), or a combination thereof.

11. The method of claim 8, further comprising using sealed metalized volumes formed form one of aluminum-polyimide, aluminum-polyester, or aluminized plastic film with aluminum on one side thereof.

12. The method of claim 8, further comprising using as the first and second spacer a material comprising one of polyaramid, polyethylene terephthalate, or polyimide and using covers formed from one of beta cloth or polyaramid laminate material.

13. An insulating blanket comprising:
    a plurality of sealed metalized volumes in a stacked arrangement, the plurality of sealed metalized volumes encapsulating a gas therein, the gas having one of a thermal insulating property, an acoustic insulating property, or a combination insulating property thereof;
    at least one spacer between adjacent sealed metalized volumes of the plurality of sealed metalized volumes, wherein the at least one spacer is outside of each of the plurality of sealed metalized volumes; and
    a protective cover surrounding the plurality of sealed metalized volumes to form a blanket having insulating properties from the plurality of sealed metalized volumes therein, wherein the protective cover defines an interior space that contains the plurality of sealed metalized volumes and the at least one spacer, and wherein the protective cover retains one of the gas or another gas within the interior space around the plurality of sealed metalized volumes and the at least one spacer.

14. The MLI of claim 1, wherein the MLI is devoid of any vent path.

15. The insulating blanket of claim 13, wherein the insulating blanket is devoid of any vent path.

* * * * *